United States Patent
Von Rosenberg et al.

(10) Patent No.: US 11,346,944 B2
(45) Date of Patent: May 31, 2022

(54) CLASSIFICATION OF STATIC AND DYNAMIC OBJECTS

(71) Applicant: Robert Bosch GmbH, Stuttgart (DE)

(72) Inventors: Wilhelm Christopher Von Rosenberg, Stuttgart (DE); Timo Winterling, Stuttgart (DE); Ulf Rueegg, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/022,420

(22) Filed: Sep. 16, 2020

(65) Prior Publication Data

US 2021/0080571 A1    Mar. 18, 2021

(30) Foreign Application Priority Data

Sep. 17, 2019    (DE) .................... 10 2019 214 111.0

(51) Int. Cl.
| | | |
|---|---|---|
| *G01S 15/52* | (2006.01) | |
| *G01S 15/931* | (2020.01) | |
| *B60R 11/04* | (2006.01) | |
| *B60R 11/00* | (2006.01) | |

(52) U.S. Cl.
CPC ............ *G01S 15/52* (2013.01); *G01S 15/931* (2013.01); *B60R 11/04* (2013.01); *B60R 2011/004* (2013.01); *G01S 2015/932* (2013.01)

(58) Field of Classification Search
CPC .... G01S 15/52; G01S 15/931; G01S 2015/93; B60R 11/04; B60R 2011/004
USPC .......................................................... 367/89
See application file for complete search history.

(56) References Cited

U.S. PATENT DOCUMENTS 8,686,875 B2 *   4/2014   Inoue ................... G01S 15/931
                                                     701/1

* cited by examiner

*Primary Examiner* — Daniel L Murphy
(74) *Attorney, Agent, or Firm* — Maginot, Moore & Beck LLP

(57) ABSTRACT

A method classifies dynamic or static objects in a surrounding area with a control device. Sound echoes are generated by at least one sensor over a defined time period. The sound echoes are emitted into the surrounding area, and are detected by the at least one sensor in order to acquire measurement data. The measurement data of the at least one sensor are received by the control device. The received measurement data are recorded in a two-dimensional array. At least one echo trace is extracted from the array. A relative speed of the detected sound echoes with respect to the at least one sensor is determined using a derivative over time of the measurement data of the array. The at least one echo trace is classified based on the determined relative speed.

10 Claims, 4 Drawing Sheets

CLASSIFICATION OF STATIC AND DYNAMIC OBJECTS

This application claims priority under 35 U.S.C. § 119 to patent application no. DE 10 2019 214 111.0, filed on Sep. 17, 2019 in Germany, the disclosure of which is incorporated herein by reference in its entirety.

The disclosure relates to a method for classifying dynamic or static objects in a surrounding area by means of a control device. Furthermore, the disclosure relates to a control device, to a computer program and to a machine-readable storage medium.

BACKGROUND

At present, ultrasonic sensors are used in vehicles to make various driving assistance functions possible, such as for example automated or partially automated parking. In this context, a differentiation between dynamic and static objects is not taken into account by corresponding ultrasonic sensors. Such a differentiation is currently not necessary to carry out parking processes since a driver of the vehicle observes the surroundings and can, if appropriate, engage in the control of the vehicle.

In automatically operated vehicles, in particular vehicles which are operated in a driverless fashion, the assumption that all the objects are static can no longer be used. Therefore, in the perception of the surroundings of the vehicle which is operated in an automated fashion it is necessary to make a differentiation between static and dynamic objects.

SUMMARY

The object on which the disclosure is based can be considered that of proposing a method for differentiating between dynamic and static objects by means of an ultrasonic sensor system.

According to one aspect of the disclosure, a method for classifying dynamic or static objects in a surrounding area by means of a control device is provided. The method can be executed, in particular, by a control device of a mobile unit which can be operated in an automated fashion.

In one step, sound signals are generated by means of at least one sensor over a defined time period, emitted into the surrounding area and detected by the at least one sensor as sound echoes in order to acquire measurement data. In this context, the sound signals and the sound echoes can be generated and received alternately by sensors in order to collect measurement data. Alternatively, sensors can be provided for a transmission mode, and different sensors can be provided for a reception mode. The measurement data of the at least one sensor is subsequently received by the control device.

Measurement data of sound echoes is received by at least one sensor over a defined time period. The at least one sensor can be a sound sensor, such as for example an ultrasonic sensor, a microphone or a sound sensor array. The at least one sensor can be configured to receive direct echoes and/or cross echoes.

The received measurement data is recorded in a two-dimensional array. For this purpose, measurement data of sound echoes which are transmitted to the control device by one sensor or by a plurality of sensors can be aggregated. The aggregation or collection of the measurement data can be carried out over a defined time period, wherein a two-dimensional array which contains time information and corresponding direct or indirect distance information is formed. Direct distance information can be distances from objects and surfaces which are calculated from the measurement data. Indirect distance information can be here transit time measurements or corresponding voltage measurements of the sensors.

In a further step, at least one echo trace is extracted from the two-dimensional array. In this context, a plurality of echo traces can also be formed. An echo trace can preferably be formed for each two-dimensional array.

An echo trace is based on acoustic energy which is reflected by one or more objects. The echo trace can be acquired in the form of the measurement data by the at least one sensor and displayed visually in an echogram. The echo trace is preferably extracted from measurement data and corresponds to acoustic energy which has been reflected by an object or a surface. Alternatively, the echo trace can be assigned to one or more objects or surfaces.

The measurement data which is received by the control device can be approximated by means of echo traces. For example, echo traces can be acquired or extracted in the form of one or more linear regressions. The echo traces therefore indicate trends in the measured values in certain areas. In particular, a gradient of the echo traces can correspond to a relative speed and can therefore be suitable for differentiating between "static" and "dynamic".

A relative speed of the detected sound echoes is acquired with respect to the at least one sensor using a derivative over time of the measurement data of the array. In particular, a relative speed of the objects or of the surfaces which reflect the sound echoes can be acquired.

The echo traces can subsequently be classified as corresponding to static or dynamic surfaces or objects on the basis of the previously determined relative speed. For this purpose, it may optionally be necessary to calculate the sensor's own speed. During a parking process, for example, this step can be dispensed with owing to the sensor's own speed being low or non-existent, so that the relative speed corresponds to an absolute speed.

According to a further aspect of the disclosure, a control device is provided, wherein the control device is configured to carry out the method. The control device can be, for example, a mobile control device or an external or stationary control device. For example, the control device can be capable of being connected to a controller of a mobile unit for carrying out automatic functions, such as, for example, automated driving functions or flight functions, or can be integrated into such a controller. An externally configured control device can be, for example, a server unit which is external to the vehicle and which is based on cloud technology.

Furthermore, according to one aspect of the disclosure, a computer program is provided which comprises commands which, during the execution of the computer program by a computer or a control device, cause the computer to carry out the method according to the disclosure. According to a further aspect of the disclosure, a machine-readable storage medium is provided on which the computer program according to the disclosure is stored.

The control device can be arranged in a mobile unit which can be capable of being operated according to the Federal Highway Research Institute (BASt) standard in an assisted, partially automated, highly automated and/or fully automated or driverless fashion. For example, the mobile unit can be configured as a vehicle, a robot, a drone, a watercraft, a rail vehicle, a robotaxi, an industrial robot, a utility vehicle, a bus, an aircraft, a helicopter and the like.

The method can implement a technically simple classification of static and dynamic objects, for example by means of ultrasonic data. On the basis of a sound signal or sound echo which is tracked over a time period, it is discerned whether an object is moving or not.

In particular, the method can also be carried out without measuring the Doppler effect and/or without Doppler information. The sound echoes can be collected over a plurality of time steps in order to carry out an appropriate classification. The raw measurement data of the sound echoes which are transmitted to the control device by the sensors are suitable for aggregation over time. In this context, all the sound echoes for each sensor can be recorded in a two-dimensional array over a time period to be defined, of, for example, 0.5 to 3 seconds. The time period can be configured in a constant or varying fashion. The control device can shorten or lengthen the time period depending on the situation and/or measuring inaccuracy. The two-dimensional arrays preferably have a time and an echo distance for the sound echoes.

So-called "echo traces" can then be formed on the basis of each available two-dimensional array. The formation of echo traces can already be implemented in accordance with the configuration of a measurement system. At this point, the method can also detect the classification as static or dynamic.

The speed can be calculated using the derivative over time of the echo distances in the two-dimensional arrays, since the exact measuring times of the individual measurements are known. If the sensor's own speed is subsequently also included, it is possible to differentiate which objects are static and which are dynamic. In the simplest case, in which the sensor's own speed corresponds to zero, the calculation of the sensor's own speed can be dispensed with.

The method can improve the sensing of a surrounding area. In particular, fusion of the sensor data and the ultimate driving behavior can be significantly improved. Moreover, a starting release for vehicles which are operated in an automated fashion can be optimized, so that a more precise statement about the time when a vehicle which is operated in an automated fashion may drive away is made. Furthermore, the method can be used as a retrofitting solution for existing ultrasonic systems. Such extension and optimization of existing ultrasonic systems can be implemented in a technically simple fashion.

According to one embodiment, an absolute speed of the object corresponding to an echo trace is calculated on the basis of the sensor's own speed. For this purpose, the mobile unit's own speed can be measured and calculated in parallel with the calculation of the relative speed. The mobile unit's own speed can be determined, for example, by evaluating measurement data of an acceleration sensor, of an odometry sensor or of a GNSS sensor. As a result, the actual or absolute speed of the object can be determined on the basis of the determined relative speed of the object with respect to the at least one measuring sensor. This can be done by subtracting the mobile unit's own speed from the relative speed. The calculations can also be carried out here in the form of speed vectors. The absolute speed associated with the echo trace can optionally be assigned to an object which is detected by means of the measurement data.

According to a further exemplary embodiment, an echo trace is classified as static if the object associated with the echo trace does not have an absolute speed. This classification can be carried out within the scope of a tolerance range or a limiting value. Measuring errors and uncertainties can be taken into account in the tolerance range. If the calculated absolute speed of the object is therefore zero or essentially zero, the "static" class can be assigned to the echo trace by the control device. The "static" classification can also be allocated by using a tolerance range if the absolute speed deviates, for example in the decimal range (which is greater than zero and less than one) of the corresponding units of measurement.

According to a further exemplary embodiment, the echo trace is classified as dynamic if the object associated with the echo trace has an absolute speed. The absolute speed of the object can deviate here from zero in order to be classified as "dynamic" or as "mobile". A tolerance range can also be taken into account in this context. For example, the "dynamic" classification can be made in the case of an absolute speed of the object which is greater than 0.05 m/s.

According to a further embodiment, objects are identified from the received measurement data of sound echoes. As a result, the objects can be detected redundantly with respect to object information of other sensors, such as for example camera sensors. In this step, implementation of a classification of an echo trace, for example into the computer program, can also be particularly efficient.

According to a further exemplary embodiment, the measurement data of sound echoes or the resulting echo traces are filtered on the basis of the identified objects in order to carry out a classification. Acquired measurement data and/or echo traces can therefore be checked to determine whether they are relevant for further evaluation by the control device. For this purpose, the determined objects can be considered to determine whether they are located, for example, within range of the at least one sensor. Taking this as a basis, it is no longer necessary to consider all the echo traces but only a number of defined echo traces. Since the number of objects is lower than a number of raw echoes, the computation expenditure of the evaluation can be reduced further.

According to a further exemplary embodiment, information is received from an object detection process, wherein the measurement data of sound echoes or the resulting echo traces are filtered on the basis of the information from the object detection process for a classification. As an alternative to the determination of the objects on the basis of the measurement data of the at least one sensor, information of the measurement data of other sensors can be used. In particular, fusion of the measurement data and/or the evaluation results with measurement data of other sensors, such as for example LIDAR sensors, radar sensors and/or camera sensors, can also be carried out in order to find out which echo traces are relevant. As a result, faulty echo traces can also be identified and removed.

For example, two-dimensional arrays of the detected objects can be extracted from a sum of received two-dimensional arrays, and a classification can be limited to these extracted two-dimensional arrays.

According to a further embodiment, the calculated absolute speed of the object and/or the determined classification of the echo traces is assigned to a determined object. As a result, the at least one detected object can be specified with further information. In particular the object can be further observed by means of sensors as a function of the classification or can be taken into account by a sensor system with reduced expenditure.

According to a further exemplary embodiment, the two-dimensional array is stored at least temporarily in a short-term memory and/or a long-term memory. In particular, for the execution of the classification, it is not necessary to make particular requirements of the computing power or the type of memory, since no transit time-critical or memory-critical algorithms, such as for example neural networks or what are referred to as support-vector machines (SVM), are necessary for the execution of the method. However, the method can also be carried out within the scope of such algorithms. The method can preferably be implemented by a technically simple buffering and by classic calculation approaches for determining the "static" or "dynamic" classification According to a further embodiment, the control device is arranged in a mobile unit. Control commands for actuating the mobile unit are preferably generated on the basis of the executed classification of the echo traces. In this context, the results of the classification can be used for the actuation of the mobile unit. The mobile unit can be configured, for example, as a vehicle, a robot, a drone, a watercraft, a rail vehicle, a robotaxi, an industrial robot, a utility vehicle, a bus, an aircraft, a helicopter and the like.

BRIEF DESCRIPTION OF THE DRAWINGS

In the text which follows, preferred exemplary embodiments of the disclosure are explained in more detail on the basis of highly simplified schematic illustrations, in which.

DETAILED DESCRIPTION

Figure 1:
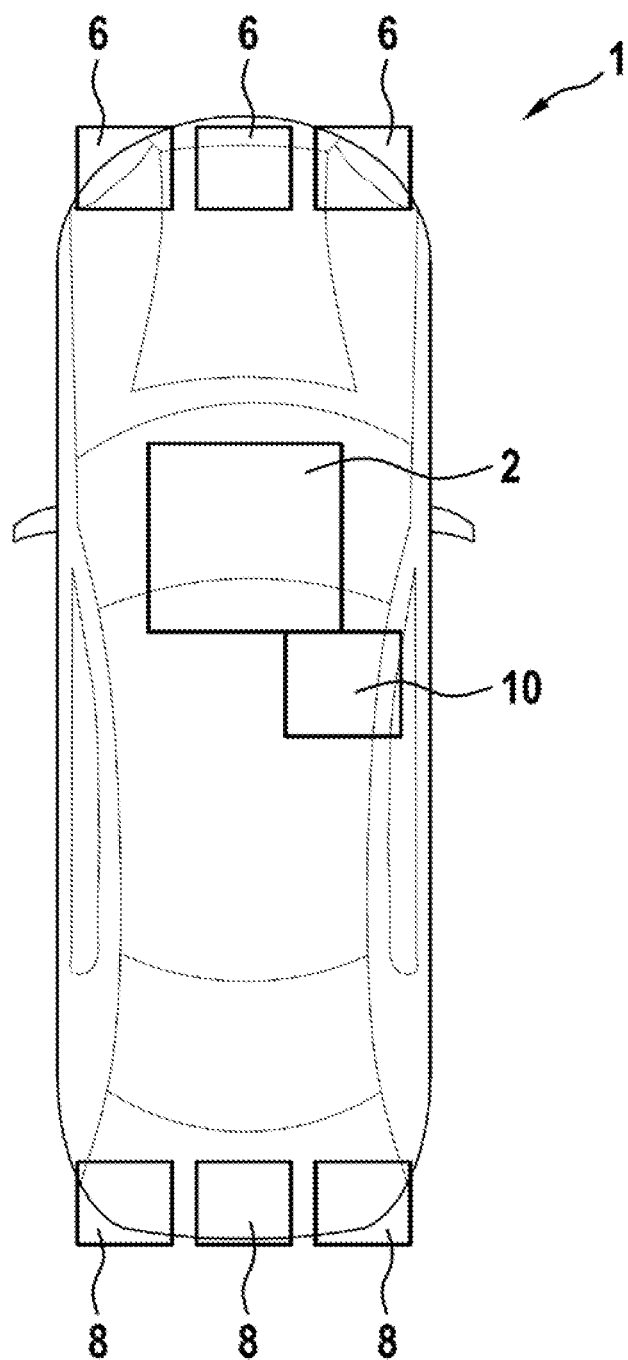
FIG. 1 shows a schematic illustration of a vehicle with a control device for carrying out a method according to one embodiment.

FIG. 1 shows a schematic illustration of a mobile unit 1 which is configured as a vehicle and has a control device 2 for carrying out a method 4 (see FIG. 4) according to one embodiment.

The vehicle 1 or the mobile unit is configured as a vehicle which can be operated in an automated fashion and has, for example, a multiplicity of sensors 6, 8. The sensors 6, 8 are configured as ultrasonic sensors and are arranged at different positions on the vehicle 1.

The sensors 6, 8 are coupled in a data-conducting fashion to the control device 2, so that the control device 2 can receive and evaluate the measurement data of the sensors 6, 8.

The received measurement data of the sensors 6, 8 can be at least temporarily stored, for example, in the control device 2 or in a machine-readable storage medium 10.

The machine-readable storage medium 10 is connected to the control device 2 and has a computer program which can be executed by the control device 2. Through the execution of the computer program, the control device 2 can be used to carry out the method 4.

Figure 2:
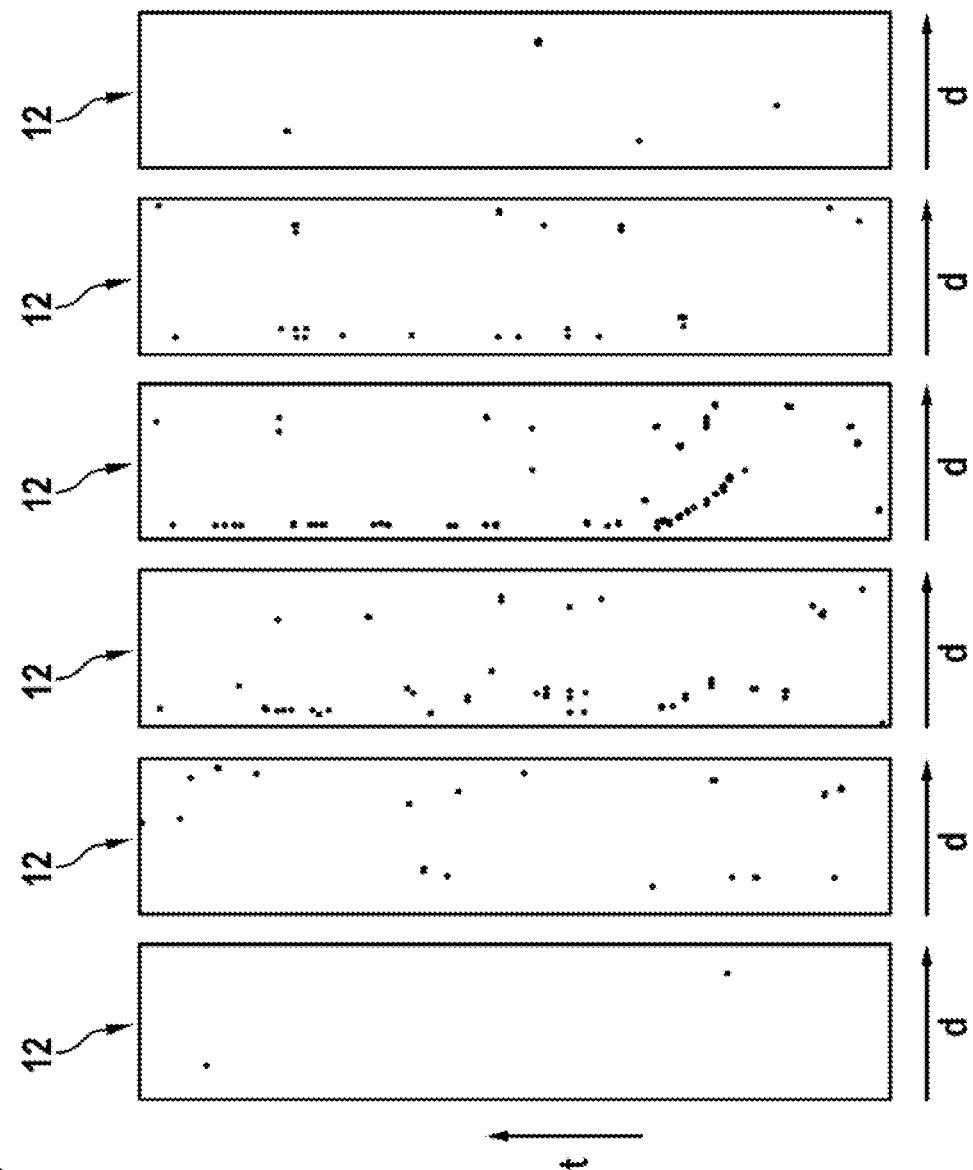
FIG. 2 shows schematic illustrations of two-dimensional arrays which are produced from measurement data from different sensors.

FIG. 2 shows schematic illustrations of two-dimensional arrays 12 which are produced from measurement data of different sensors 6, 8. The raw measurement data of sound signals can be used for the further processing of the measurement data by the control device 2.

The illustrations show schematic views of the measurement data of the sensors 6, 8 which represent a measurement of a distance d over a time t. All the sound echoes for each sensor 6, 8 are then recorded in a two-dimensional array 12 over a time period.

Figure 3:
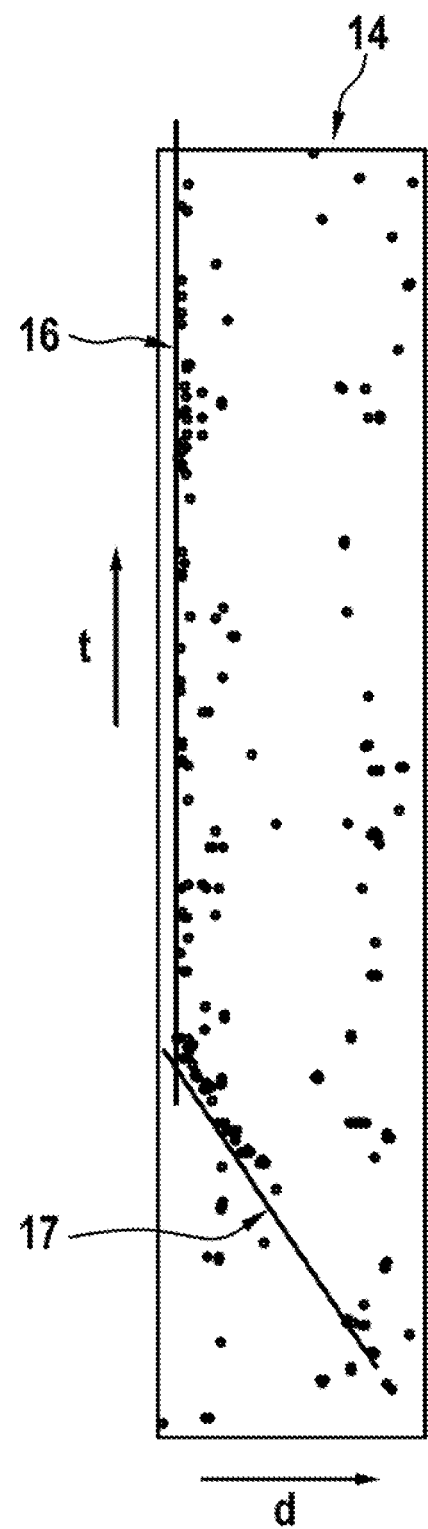
FIG. 3 shows a schematic illustration of a combined array composed of arrays shown in FIG. 1.

FIG. 3 is a schematic illustration of a combined array 14 composed of arrays 12 which are shown in FIG. 2. In this context, all the measurement data of the sensors 6, 8 are combined in the array 14. In particular an echogram with a distance d plotted over a time t is illustrated.

The measurement data of the sensors 6, 8 can be acquired here from direct echoes of the respective sensors 6, 8 or from cross echoes from the sensors 6, 8. The measurement data which is illustrated in the two-dimensional array 14 shows that an object or a surface is approaching at least one sensor 6, 8 and subsequently maintains its distance d from the sensor 6, 8.

The respective sections of the measurement data can be described by means of echo traces 16, 17. The echo traces 16, 17 correspond to acoustic energy which is reflected back to the sensor 6, 8 from a surface (not denoted in more detail) and is represented visually in the echogram. The echo traces 16, 17 can be determined or approximated, for example, by a linear regression. In particular, the differentiation between "static" and "dynamic" can be made on the basis of the gradient of the echo traces 16, 17.

The gradient of a first echo trace 16 is zero or infinite, so that a static object can be classified here.

The second exemplary echo trace 17 has a gradient which differs from zero and which corresponds to a speed. Such an echo trace 17 can be used to define a dynamic classification.

Figure 4:
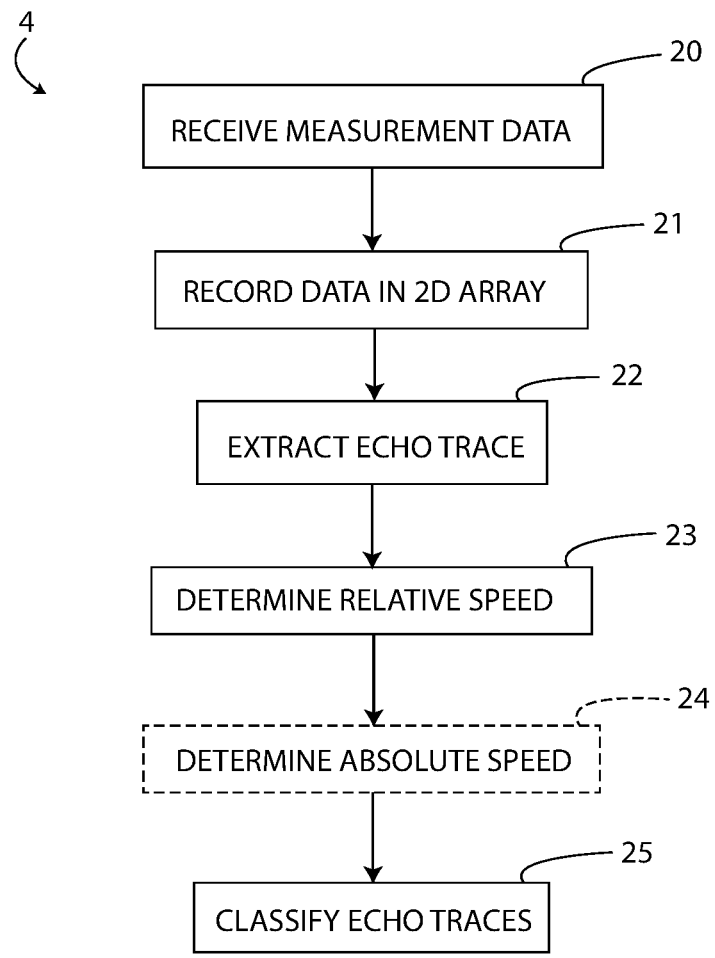
FIG. 4 shows a schematic flow chart of a method according to one embodiment.

FIG. 4 shows a schematic flow chart of a method 4 according to one embodiment. The method 4 serves to classify dynamic or static objects in a surrounding area of the vehicle 1 by means of the control device 2.

In a step 20, measurement data of sound echoes are received by the sensors 6, 8 over a defined time period t. The time period t can be, for example, 1 to 60 seconds. The measurement data of the sensors 6, 8 can result from direct echoes or from cross echoes here.

The received measurement data is recorded 21 in a two-dimensional array 12, 14.

Subsequently, in a further step 22, echo traces 16, 17 are extracted from the arrays 12, 14.

A relative speed of the received sound echoes with respect to the sensors 6, 8 can be determined 23 by means of a derivation over time of the measurement data or of the arrays 12, 14 of the sensors 6, 8.

In an optional step 24, an absolute speed of the object corresponding to the echo traces 16, 17 is formed.

Subsequently, a classification of the echo traces 16, 17 as "static" or as "dynamic" is performed 25 by means of the control device 2.

What is claimed is:

1. A method for classifying dynamic or static objects in a surrounding area, comprising:
generating sound signals with at least one sensor over a defined time period, the generated sound signals emitted into the surrounding area;
detecting sound echoes, based on sound signals, with the at least one sensor in order to generate measurement data, the sound echoes reflected by an object in the surrounding area;
receiving the measurement data with a control device operably connected to the at least one sensor;
recording the received measurement data in a two-dimensional array;
extracting at least one echo trace from the two-dimensional array, the at least one echo trace based on the object;

determining a relative speed of the object with respect to the at least one sensor using a derivative over time of the at least one echo trace; and classifying the object as either a dynamic object or a static object based on the determined relative speed.

2. The method according to claim 1, further comprising:
calculating an absolute speed of the object based on a speed of the at least one sensor relative to the object.

3. The method according to claim 2, further comprising:
classifying the object as the static object when the calculated absolute speed is zero.

4. The method according to claim 3, further comprising:
classifying the object as the dynamic object when the calculated absolute speed is non-zero.

5. The method according to claim 1, further comprising:
receiving information from an object detection process; and
filtering the measurement data based on the received information.

6. The method according to claim 1, further comprising:
storing the two-dimensional array at least temporarily in a short-term memory and/or a long-term memory.

7. The method according to claim 1, wherein:
the control device is arranged in a mobile unit, and
control commands configured to actuate the mobile unit are generated based on the classification of the object.

8. The method according to claim 1, wherein the control device is configured to carry out the method.

9. The method according to claim 1, wherein a computer program comprises commands which, during execution of the computer program by a computer or the control unit, causes the computer or the control unit to carry out the method.

10. The method according to claim 9, wherein a machine-readable storage medium is configured to store the computer program.

* * * * *